United States Patent
Roeber et al.

(10) Patent No.: US 6,386,240 B1
(45) Date of Patent: May 14, 2002

(54) MULTILAYER PLASTIC PIPE HAVING GOOD ADHESION BETWEEN LAYERS

(75) Inventors: Stefan Roeber, Hamburg; Hans-Dieter Herrmann, Marl, both of (DE)

(73) Assignee: Degussa-Huels Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 08/413,230

(22) Filed: Mar. 30, 1995

(30) Foreign Application Priority Data

May 21, 1994 (DE) .............................................. 4418006

(51) Int. Cl.$^7$ ................................................ F16L 11/04
(52) U.S. Cl. .................. 138/137; 138/141; 138/DIG. 1
(58) Field of Search ................................. 138/118, 137, 138/140, 141, 177, DIG. 1

(56) References Cited

U.S. PATENT DOCUMENTS

| | | | | |
|---|---|---|---|---|
| 4,129,472 A | * | 12/1978 | Hobes et al. | 138/DIG. 1 |
| 4,207,364 A | * | 6/1980 | Nyberg | 138/141 |
| 4,600,615 A | * | 7/1986 | Hyodo et al. | 138/125 |
| 4,907,625 A | * | 3/1990 | Ito et al. | 138/125 |
| 5,313,987 A | * | 5/1994 | Röber et al. | 138/137 |
| 5,404,915 A | * | 4/1995 | Mügge et al. | 138/137 |
| 5,425,817 A | * | 6/1995 | Mügge et al. | 138/137 |

FOREIGN PATENT DOCUMENTS

| | | |
|---|---|---|
| EP | 0 522 380 | 1/1993 |
| EP | 0 542 182 | 5/1993 |
| EP | 0 542 184 | 5/1993 |
| EP | 0 569 681 | 11/1993 |
| EP | 0 637 509 | 2/1995 |
| GB | 2 029 766 | 3/1980 |

* cited by examiner

*Primary Examiner*—James Hook
(74) *Attorney, Agent, or Firm*—Oblon, Spivak, McClelland, Maier & Neustadt, P.C.

(57) ABSTRACT

A plastic pipe based on polyolefins is provided, which pipe, compared with single-layer pipes of polyolefins, has improved barrier action against (petro)chemical materials, in particular against methanol-containing fuels. This is achieved by a multilayer plastic pipe which comprises the following layers:

I. at least one layer based on a polyolefin,

II. at least one layer based on a thermoplastic polyester, bonded via

III. a layer between them of a suitable coupling agent which contains reactive groups, with adjacent layers being cohesively bonded to one another. The invention makes it possible to obtain plastic pipes having the desired improved property profile.

15 Claims, 1 Drawing Sheet

MULTILAYER PLASTIC PIPE HAVING GOOD ADHESION BETWEEN LAYERS

BACKGROUND OF THE INVENTION

1. Field of the Invention

The present invention relates to multilayer laminates of polyolefins and thermoplastic polyesters. The invention laminates are particularly suited for the manufacture of pipes.

2. Discussion of the Background

Plastic pipes made of polyolefins, in particular polyethylene and polypropylene, are known and are used in many applications. To perform their tasks the pipes have to be, inter alia, inert to the medium flowing therein and resistant to high and low temperatures and to mechanical stressing.

Single-layer pipes of polyolefins are unsuitable for many applications. For example, polyolefins provide insufficient barrier action against fuels. This leads, because of increased environmental consciousness and corresponding strengthening of world-wide legal regulations, to single-layer polyolefin pipes used for the transport of fuels, for example in underground supply lines, having to be replaced by pipes having improved barrier action.

JP-A 51-92880, incorporated herein by reference, describes composites, pipes and hollow bodies made of a polyester layer and a polyolefin layer, in which these two layers are bonded via an intermediate layer of modified polyethylene which contains from 0.1 to 10 mol % of an unsaturated carboxylic acid or a derivative thereof. This intermediate layer can comprise copolymers of ethylene and methacrylic acid, ethylene and acrylic acid or ethylene and vinyl acetate. However, and as will be shown in the examples of this document, the layers of these reference composites can be mechanically separated from one another. There is clearly insufficient cohesive adhesion between layers.

OBJECTS OF THE INVENTION

It is therefore an object of the present invention to provide multilayer plastic laminates, particularly multilayer plastic pipes, based on polyolefins, in particular polyethylene, which, compared with single-layer pipes of polyolefins, have improved barrier action against (petro)chemical materials, in particular against methanol-containing fuels.

Another object of the present invention is to provide laminates, particularly multilayer pipes, wherein all adjacent layers are cohesively bonded to one another.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
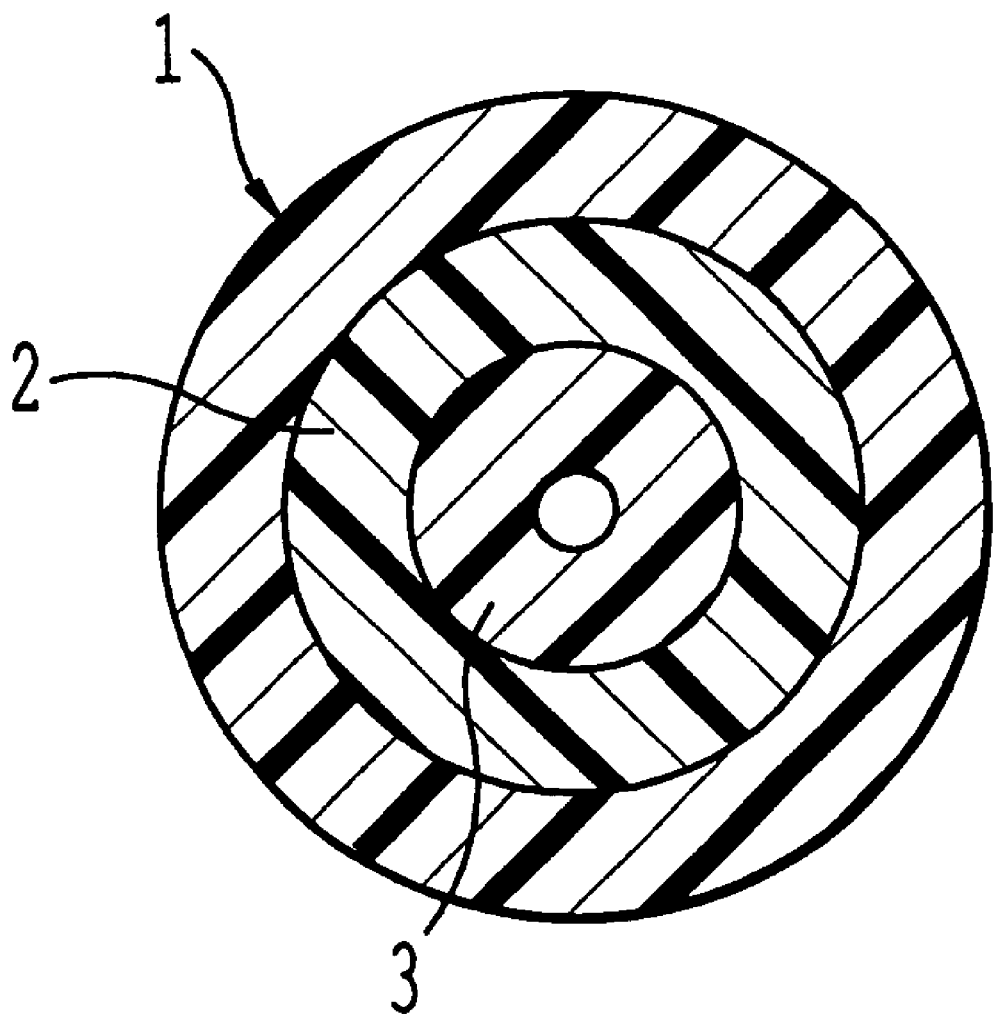
FIG. 1 shows an embodiment of the present multilayer pipe in which polyolefin layer 1 and thermoplastic polyester layer 3 are adhesively bonded by layer 2.

These and other objects are achieved by multilayer plastic laminates and pipes which comprise the following layers:

I. at least one layer based on a polyolefin,

II. at least one layer based on a thermoplastic polyester, layers I and II bonded via III. a layer between layers I and II based on a suitable coupling agent which contains reactive groups, wherein adjacent layers are cohesively bonded to one another.

FIG. 1 shows an embodiment of the invention in which reference 1 refers to the polyolefin layer I, reference 2 refers to intervening bonding layer III and reference 3 refers to thermoplastic polyester layer II.

The term "based on" as used herein means that a layer, etc. contains at least 50% by weight of the specified material, including 60%, 70%, 80%, 90% and 100% by weight of the specified material.

Layer I preferably comprises a molding composition based on polyethylene or polypropylene. Layer II preferably comprises a linear, crystalline polyester, preferably polyethylene terephthalate or polybutylene terephthalate. The coupling agent of layer III preferably comprises a polyolefin base which additionally contains reactive groups.

Sufficient cohesive adhesion is achieved by means of this simple embodiment. It can be advantageous to modify the polyester, however. This can be achieved, for example, by the addition of a compound having two or more epoxy groups, a compound having two or more oxazoline groups, a compound having two or more isocyanate groups, or combinations thereof.

In a preferred embodiment, layer II comprises a molding composition based on a mixture of a. from 99 to 60% by weight of a thermoplastic polyester and b. from 1 to 40% by weight of at least one compound containing at least two isocyanate, epoxy or oxazoline groups, where the functional groups originating from component b are preferably present in layer II in a concentration of between 0.01 and 3% by weight. Components II.b. are known in the art and prepared by art-accepted procedures.

Layer I comprises molding compositions based on polyolefins. Suitable polyolefins are homopolymers and copolymers based on, inter alia, ethylene, propylene, 1-butene, 1-hexene and 1-octene, for example. Other suitable polymers are copolymers and terpolymers which, in addition to the above-mentioned monomers, contain further monomers, in particular dienes such as, for example, ethylidenenorbornene, cyclopentadiene or butadiene, for example. They are prepared by art-accepted procedures. Preference is given to molding compositions based on polypropylene; particular preference is given to those based on polyethylene.

The molding compositions for layer I can be crosslinked in accordance with methods known in the art, so as to achieve improvement in mechanical properties, e.g., cold impact toughness and geometric stability on heating. Crosslinking is carried out, for example, by radiation crosslinking or by means of moisture crosslinking of a silane-containing polyolefin molding composition.

The thermoplastic polyesters of layer II have the following basic structure:

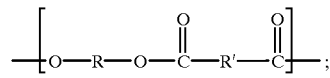

where R is a divalent branched or unbranched aliphatic and/or cycloaliphatic radical having from 2 to 12, preferably from 2 to 8, carbon atoms in the carbon chain and R' is a divalent aromatic radical having from 6 to 20, preferably from 8 to 12, carbon atoms in the carbon skeleton.

Examples of diols which may be used in the preparation of the invention polyesters are ethylene glycol, trimethylene glycol, tetramethylene glycol, hexamethylene glycol, neopentyl glycol, cyclohexanedimethanol and the like.

Up to 25 mol % of the specified diol can be replaced by a diol having the following general formula

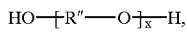

where R" is a divalent radical having from 2 to 4 carbon atoms and x can assume a value of from 2 to 50.

The diols which are preferably used are ethylene glycol and tetramethylene glycol.

Suitable aromatic dicarboxylic acids which can be used in the preparation of the invention polyesters are, for example, terephthalic acid, isophthalic acid, 1,4-, 1,5-, 2,6- or 2,7-naphthalenedicarboxylic acid, diphenic acid, (diphenyl ether)-4,4'-dicarboxylic acid or polyester-forming derivatives thereof, such as dimethyl esters.

Up to 20 mol % of these dicarboxylic acids can be replaced by aliphatic dicarboxylic acids such as, for example, succinic acid, maleic acid, fumaric acid, sebacic acid, dodecanedioic acid, etc.

The preparation of the thermoplastic polyesters according to the invention is known in the art. See, for example DE-A 24 07 155, DE-A 24 07 156; Ullmanns Encyclopädie der technischen Chemie, 4th Edition, Volume 19, page 65 ff, Verlag Chemie GmbH, Weinheim 1980, all incorporated herein by reference.

The invention polyesters preferably have a viscosity number (J value) in the range from 80 to 240 cm³/g. Preferred thermoplastic polyesters are polyethylene terephthalate and polybutylene terephthalate. If desired, the polyesters can be impact-modified.

In a preferred embodiment, the invention polyesters are modified with compounds bearing at least two isocyanate groups (component II.b.). Suitable compounds for this purpose are difunctional and higher-functional isocyanates, in particular aromatic and (cyclo)aliphatic isocyanates such as, for example, 1,4-phenylenediisocyanate, 2,4-toluenediisocyanate, 2,6-toluenediisocyanate, 1,5-naphthylenediisocyanate, 1,6-hexamethylenediisocyanate, diphenylmethane-2,4-diisocyanate, diphenylmethane-4,4,'-diisocyanate, diphenylmethane-2,2'-diisocyanate, isophoronediisocyanate, 1,4-tetramethylenediisocyanate, 1,12-dodecanediisocyanate and triphenylmethane-4,4', 4"triisocyanate. Further examples are cyclohexane-1, 3diisocyanate, cyclohexane-1,4-diisocyanate, cyclobutane-1,3-diisocyanate, 2,4-hexahydrotoluylenediisocyanate, 2,6-hexahydrotoluylenediisocyanate, hexahydro-1,3-phenylenediisocyanate, hexahydro-1,4-phenylenediisocyanate, norbornanediisocyanate, p- or m-xylylenediisocyanate, perhydro-2,4-diphenylmethanediisocyanate and perhydro-4,4,-diphenylmethanediisocyanate.

Suitable isocyanates are also those containing isocyanurate, urethane, acylated urea, biuret, carbodiimide or ester groups. Furthermore, use can be made of isocyanates containing oligomeric fatty acid or perchlorinated arylisocyanates. The isocyanates can also be used as blocked isocyanates. Examples include reaction products of the above-mentioned isocyanates with diols, lactams or oximes.

Preference is given to 2,4- and 2,6-toluenediisocyanates and isocyanates containing isocyanurate, urethane, urea or biuret groups. Preference is furthermore given to isophoronediisocyanates and also isocyanurates derived therefrom or mixtures prepared therefrom.

In a further preferred embodiment, layer II comprises
a. from 99 to 95% by weight of a thermoplastic polyester and
b. from 1 to 5% by weight of a mixture of
  1. from 30 to 70% by weight of at least one compound containing two isocyanate groups and
  2. from 30 to 70% by weight of at least one compound containing more than two isocyanate groups,
with the isocyanate groups originating from the component II.b. being present in layer II. in a concentration between 0.01 and 3% by weight.

Component II.b.1. are compounds which bear two isocyanate groups. Suitable compounds of this type are all the above-mentioned compounds having two isocyanate groups. Compounds which have been found to be particularly advantageous are isophoronediisocyanate and also reaction products thereof with itself and also with suitable reactants such as α,ω-diols having 2–10 carbon atoms in the carbon chain. Preferred reaction products are obtained, for example, from the reaction of at least two molecules of isophoronediisocyanate, with in each case two isocyanate groups being joined by reaction to form a biuret group.

Further advantageous reaction products are obtained, for example, by reaction of, in each case, two isophoronediisocyanate molecules with a molecule of diol, with in each case one isocyanate group of the isophoronediisocyanate forming a urethane bond with one of the hydroxyl groups of the diol. Examples of particularly suitable diols are butanediol and diethylene glycol.

Compounds useful as component II.b.2. are those which contain more than two and preferably exactly three isocyanate groups. Suitable compounds of this type are, for example, triphenylmethane-4,4',4"-triisocyanate, and also reaction products of the diisocyanates mentioned above in respect of component II.b.1., in particular triisocyanurates of these diisocyanates such as, for example, the triisocyanurate which is formed by reaction of three molecules of hexamethylenediisocyanate. Particular preference is given to the triisocyanurate which is formed by reaction of three molecules of isophoronediisocyanate.

The isocyanate groups of the components II.b.1. and II.b.2. can be present in blocked form. The blocking of isocyanate groups is known (See, e.g., Paint Resin 58 (1988) 5, 18–19 incorporated herein by reference). For example, blocking by reaction of the isocyanate groups with diols, pyrazoles, oximes, in particular ketoximes, and also lactans, in particular caprolactam, is described.

To the molding compositions of layers I and II there may be added conventional auxiliaries and additives such as, for example, flame retardants, stabilizers, plasticizers, processing aids, viscosity improvers, fillers (in particular those for improving conductivity), pigments, and the like.

Suitable coupling agents of layer III are molding compositions which, in the production of multilayer pipes by coextrusion, give a cohesive bond between adjacent layers I and II, so that the layers in the finished pipe can no longer be mechanically separated from one another.

Suitable coupling agent molding compositions comprise a polymer base which is modified with suitable reactive groups. The reactive groups can be introduced either by copolymerization together with, e.g., an olefin or by a grafting reaction. In the grafting reaction, a preformed polyolefin is reacted in known manner with an unsaturated, functional monomer and advantageously a free-radical donor at elevated temperature.

Suitable reactive groups are, for example, acid anhydride groups, N-acyllactam groups, carboxylic acid groups, epoxy groups, oxazoline groups, trialkoxysilane groups or hydroxyl groups. Of these, preference is given to acid anhydride groups. Coupling agents which are particularly suitable are those containing from 0.05 to 10% by weight of anhydride groups, with a content of from 0.2 to 3% by weight being preferred and a content of from 0.25 to 1% by weight being particularly preferred.

The selection of a suitable polymer base to be modified depends on the particular composition of layer I (based on a polyolefin): the base polymer of the coupling agent layer should be selected so that the coupling agent is as compatible as possible, preferably miscible, with polyolefinic layer I. If layer I comprises a molding composition based on polypropylene, then polypropylene is also suitable as the basis polymer of the coupling agent layer III.

Preferably, layer I comprises a molding composition based on polyethylene. In this case, ethylene-methyl methacrylate-maleic anhydride copolymers and particularly preferably ethylene-vinyl acetate-maleic anhydride copolymers have, inter alia, been found to be particularly suitable coupling agents.

Suitable functionalized polyethylenes and polypropylenes are obtainable, inter alia, under the trade names BYNEL (DuPont), PRIMACOR (Dow), POLYBOND (BP), OREVAC (Elf), HERCOPRIME (Hercules), EPOLENE (Eastman), HOSTAMONT (Hoechst), EXXELOR (Exxon) and ADMER (Mitsui Petrochemical).

The multilayer pipes of the invention can contain layers I, II and III a plurality of times. The layers are arranged in such a way that layers I and II are always joined to one another via layer III between them. Examples of possible arrangements of layers are shown in the following table.

TABLE 1

Examples of the arrangement of layers of multilayer plastic pipes according to the invention (built from the outside to the inside)

| Arrangement of layers no. | Build-up |
| --- | --- |
| 1 | Layer I |
|   | Layer III |
|   | Layer II |
| 2 | Layer II |
|   | Layer III |
|   | Layer I |
| 3 | Layer I |
|   | Layer III |
|   | Layer II |
|   | Layer III |
|   | Layer I |
| 4 | Layer II |
|   | Layer III |
|   | Layer I |
|   | Layer III |
|   | Layer II |

The arrangement of layers depicted in no. 1 is preferred.

Furthermore preferred are multilayer pipes having this arrangement of layers, in which the thickness of layer II makes up from 1 to 50%, preferably from 5 to 20%, of the total wall thickness of the pipe of laminate.

The thickness of the layer III is preferably between 0.05 and 20%, particularly preferably between 0.4 and 4%, of the total wall thickness of the pipe or laminate. The total wall thickness is here the sum of the individual layer thicknesses and is equal to the wall thickness of the pipe or laminate.

The multilayer pipes of the invention are preferably produced by means of coextrusion and have excellent resistance to and barrier action against diffusion of chemical agents, solvents and fuels, in particular methanol-containing fuels. Furthermore, the layers are cohesively bonded to one another so that, for example on thermal expansion, bending or thermoforming of the multilayer pipe, etc., the various layers are not sheared from one another. This excellent layer adhesion is retained even on prolonged contact with fuels, in particular on contact with methanol-containing fuels.

The laminates and plastic pipes of the invention are preferably used in the transport of chemical, in particular petrochemical, materials and for conveying brake, cooling or hydraulic fluids, or fuel, in particular including methanol-containing and ethanol-containing fuel. The pipes are particularly suitable for laying above and below ground in gas stations and similar areas for conveying (petro)chemical materials, in particular fuel, through them. The invention pipes are also suitable for use in the motor vehicle sector for conveying fuels, in particular methanol containing fuels. They not only have excellent barrier action against diffusion of chemical agents which are conveyed internally through the pipe, but also against chemical agents, solvents, aqueous salt solutions and the like which can penetrate from the outside through the pipe wall into the liquids being transported in the pipe. For this reason, the pipes of the invention are also suitable for the transport of drinking water and other liquids, particularly if the danger of contamination by diffusion from the outside to the inside cannot be ruled out. This applies, for example, to drinking water pipes which are laid in contaminated or polluted ground.

A further application of the multilayer laminates and pipes of the invention is the production from them, for example by blow molding, of hollow bodies such as tanks or filling ports, in particular for the motor vehicle sector.

EXAMPLES

The invention will now be further described by means of non-limiting examples.

The results given in the examples were determined by means of the following measurement methods.

The testing of the mechanical separability at the interfaces of the layers is carried out using a metal wedge (cutting angle 5 degrees; applied weight: 2.5 kg); an attempt is here made to separate the material layers from one another. If separation occurs at the boundary between the components, the adhesion is poor. If, in contrast, the separation occurs completely or predominantly within one of the two main component layers I and II, then cohesive adhesion of layers is present for the purposes of the present invention.

The determination of the diffusion of fuel constituents is carried out on pipes using a fuel mixture (fuel M15: 42.5% by volume of isocatane, 42.5% by volume of toluene and 15% by volume of methanol; fuel C: 50% by volume of isooctane and 50% by volume of toluene) at 40° C. and at 23° C. Samples having a length of 200 mm are filled with the fuel mixture and during the measurement are connected to a filled fuel reservoir. The determination of the fuel diffusion is carried out by measurement of the weight loss. The diffusion is determined as mass loss by diffusion over time (measurement every 24 hours). The measure given is the recorded mass loss per unit area which is measured when the diffusion process is in equilibrium, i.e. when the mass loss determined per 24 hours no longer changes with time.

The determination of the solution viscosity (viscosity number J) of the polyester is carried out in a 0.5% by weight phenol/o-dichlorobenzene solution (weight ratio 1:1) at 25° C. in accordance with DIN 53 728/ISO 1628/5, part 5.

For the determination of the isocyanate group content, 6 g of layer II (polyester, isocyanate) are dissolved at 180° C.

in a mixture of dichlorobenzene/dibutylamine (80:20% by volume). The solution is titrated at 20° C. with 10% strength hydrochloric acid using bromophenol as indicator (DIN 53 185).

The determination of the MFI values of the polyolefins is carried out at 190° C. using an applied weight of 5 kg in accordance with DIN 53 735.

Examples denoted by letters are not according to the invention.

Polvolefins (layer I)

PO 1: High density polyethylene (HDPE); MFI (190/5)= 0.8 gil0 min; VESTOLEN A 4042 R; Huels AG.

PO 2: High density polyethylene (HDPE); NFI (190/5)= 0.5 g/10 min; VESTOLEN A 5041 R; Huels AG.

Polyesters (laver II)

PE 1: Mixture of
  a. 98% by weight of homopolybutylene terephthalate (J value 115 cm$^3$/g); VESTODUR 1000, Huels AG and
  b. 2% by weight of a mixture comprising
    b.1. 50% by weight of a compound prepared from 2 mol of isophoronediisocyanate and 1 mol of diethylene glycol, with the bonding in each case being via a urethane bond and the remaining NCO groups being blocked with caprolactam, and
    b.2. 50% by weight of isocyanurate of isophoronediisocyanate (VESTANAT T 1890; Huels AG).

NCO group concentration in the mixture PE 1: 0.08% by weight.

PE 2: Mixture of
  a. 97% by weight of homopolybutylene terephthalate (J value 155 cm$^3$/g); VESTODUR 1000; Huels AG and
  b. 3% by weight of a mixture comprising
    b.1. 40% by weight of isophoronediisocyanate blocked with caprolactam and
    b.2. 60%by weight of isocyanurate of isophoronediisocyanate, with the remaining NCO groups being blocked with caprolactam.

NCO group concentration in the mixture PE 2: 0.15% by weight.

PE 3: Homopolybutylene terephthalate (J value: 165 cm$^3$/g; VESTODUR 3000; Huels AG).

Coupling Agent (Layer III)

CA 1: Molding composition of polyethylene (LDPE), modified with maleic anhydride so that the molding composition contains 0.4% by weight of anhydride groups.

CA 2: Molding composition of ethylene-vinyl acetate copolymer, modified with maleic anhydride so that the molding composition contains more than 0.1% by weight of anhydride groups.

Production of Multilayer Pipes

Examples 1 to 7 and Comparative Examples A to D

Pipes having one, two and three layers and a total wall thickness (=wall thickness of the pipe) of 1.45 mm and an external diameter of 12 mm were produced. The pipes were produced on a laboratory extrusion facility having a five-layer die (in the production of the pipes having one, two and three layers, the channels not required remained closed).

Furthermore, pipes having two and three layers and
  a) 5.8 mm total wall thickness and 63 mm external diameter and
  b) 10 mm total wall thickness and 110 mm external diameter were produced. The production of these pipes was carried out on a production facility having 3 extruders and a three-layer die.

The barrel temperatures were 205° C. (PO 1, PO2); 255° C. (CA 1, CA 2), 270° C. (PE 1, PE 2, PE 3) and 280° C. (PE 3).

TABLE 2

Pipes having external diameter 12 mm, wall thickness 1.45 mm

| Build-up of layers (from the outside to the inside) | Adhesion of layers Layers separable | | Permeation of fuel [g/m$^2$ d] | |
|---|---|---|---|---|
| | after production of pipe | after storage 14 d in M15 at 23° C. | M15 23° C. | M15 40° C. | Fuel C 40° C. |
| A 1.45 mm PO 1 (single-layer pipe) | Not applicable | | 15 | 50 | 64 |
| B 1.10 mm PO 1 0.35 mm PE 1 | Yes | Yes | 0.1 | <4 | <1 |
| C 1.10 mm PO 1 0.35 mm PE 3 | Yes | Yes | 0.1 | <4 | <1 |
| 1 0.90 mm PO 1 0.20 mm CA 1 0.35 mm PE 1 | No | No | 0.1 | 4 | 1 |
| 2 0.90 mm PO 2 0.20 mm CA 2 0.35 mm PE 2 | No | No | 0.1 | 4 | 1 |

TABLE 3

Pipes having
a) External diameter 63 mm, wall thickness 5.8 mm and
b) External diameter 110 mm, wall thickness 10 mm.

| Build-up of layers (from the outside to the inside) | External diameter [mm] | Wall thickness [mm] | Adhesion of layers Layers separable | |
|---|---|---|---|---|
| | | | after production of pipe | after storage 20 d in M15 at 23° C. |
| D 5.20 mm PO 1 0.60 mm PE 1 | 63 | 5.8 | Yes | Yes |
| E 5.20 mm PO 2 0.60 mm PE 3 | 63 | 5.8 | Yes | Yes |
| 3 5.20 mm PO 1 0.05 mm CA 1 0.55 mm PE 1 | 63 | 5.8 | No | No |
| 4 8.80 mm PO 1 0.05 mm CA 1 1.15 mm PE 1 | 110 | 10 | No | No |
| 5 5.20 mm PO 2 0.05 mm CA 1 0.55 mm PE 1 | 63 | 5.8 | No | No |
| 6 5.20 mm PO 1 0.05 mm CA 1 0.55 mm PE 3 | 63 | 5.8 | No | No |
| 7 8.80 mm PO 1 0.05 mm CA 1 1.15 mm PE 3 | 110 | 10 | No | No |

This application is based on German application P 44 18 006.3 filed May 21, 1994, incorporated herein by reference. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multilayer plastic pipe comprising the following layers:
   I. at least one layer comprising a polyolefin,
   II. at least one layer comprising a thermoplastic polyester containing at least one compound having two or more epoxy groups, having two or more oxazoline groups, having two or more isocyanate groups, and combinations thereof, and
   III. at least one layer lying between layers I and II and comprising a coupling agent containing reactive groups, wherein adjacent layers are cohesively bonded to one another.

2. The multilayer plastic pipe according to claim 1, wherein layer II comprises a molding composition based on a Polyester selected from the group consisting of polybutylene terephthalate and polyethylene terephthalate.

3. The multilayer plastic pipe according to claim 1, wherein layer I comprises a polvolefin selected from the group consisting of polyethylene and polypropylene.

4. The multilayer plastic pipe according to claim 1, wherein the coupling agent of the layer III contains acid anhydride groups.

5. The multilayer plastic pipe according to claim 4, wherein the anhydride groups in layer III are obtained by reaction of a base polymer with maleic anhydride.

6. The multilayer plastic pipe according to claim 4, wherein the coupling agent of layer III contains from 0.05 to 10% by weight of acid anhydride groups.

7. The multilayer plastic pipe according to claim 6, wherein the coupling agent of layer III contains from 0.2 to 3 by weight of acid anhydride groups.

8. The multilayer plastic pipe according to claim 1, wherein the pipe comprises three layers having the following arrangement:
   External layer: Layer I
   Intermediate layer: Layer III
   Internal layer: Layer II.

9. The multilayer plastic pipe according to claim 8, wherein the thickness of layer II is from 1 to 50% of the total wall thickness.

10. The multilayer plastic pipe according to claim 9, wherein the thickness of layer II is from 5 to 20% of the total wall thickness.

11. The multilayer plastic pipe according to claim 1, wherein the thickness of layer III is from 0.05 to 20% of the total wall thickness.

12. The multilayer plastic pipe according to claim 1, containing therewithin (petro)chemical materials.

13. A hollow body produced from the multilayer plastic pipe of claim 1.

14. The multilayer plastic pipe according to claim 1, wherein layer II comprises a mixture of
   a) from 99 to 60% by weight of a linear, crystalline polyester and
   b) from 1 to 40% by weight of at least one compound having two or more epoxy groups, having two or more oxazoline groups, having two or more isocyanate groups, and combinations thereof, wherein the concentration of epoxy, oxazoline or isocyanate groups present in layer II ranges from 0.01 to 3% by weight.

15. The multilayer plastic pipe according to claim 1, wherein layer II comprises a mixture of
   a) from 99 to 95% by weight of a linear, crystalline polyester and
   b) from 1 to 5% by weight of a mixture of
      b-1) from 30 to 70% by weight of at least one compound containing two isocyanate groups, and
      b-2) from 30 to 70% by weight of at least one compound containing more than two isocyanate groups,
   and wherein the isocyanate groups in component IIb are present in layer II in a concentration of from 0.01 to 3% by weight.

* * * * *